RECOGNITION SYSTEM FOR READING MACHINES

Filed Oct. 26, 1961 2 Sheets-Sheet 1

INVENTOR
Lyle Mader

BY Joseph A. Genovese & Max L. Libman

ATTORNEYS

INVENTOR

Lyle Mader

BY Joseph A. Genovese & Max L. Libman

ATTORNEYS

United States Patent Office 3,176,271
Patented Mar. 30, 1965

3,176,271
RECOGNITION SYSTEM FOR READING MACHINES

Lyle W. Mader, Olney, Md., assignor, by mesne assignments, to Control Data Corporation, Minneapolis, Minn., a corporation of Minnesota Filed Oct. 26, 1961, Ser. No. 147,887
8 Claims. (Cl. 340—146.3)

This invention relates to systems for identifying characters by machine, and particularly to the technique for processing the character-identity data obtained by examining the characters.

The term "character" as used herein is defined as any letter, numeral, symbol, word, group of letters or words, pattern or portion thereof capable of being identified by machine.

There are several philosophical approaches to identifying characters by machine, for example, curve tracing, map-matching and stroke analysis. Among other distinctions, the map-matching technique differs from curve tracing (for example) by considering not only the character but also at least significant points of the character-background. This may be done by using optical masks as in the J. Rabinow Patent No. 2,933,246 or the J. Rabinow pending application Serial No. 140,266, now abandoned, entitled Optical Mask Reading Machine. Alternatively, this may be accomplished by electronic means such as disclosed in the J. Rabinow et al. application Patent No. 3,104,369, now Patent No. 3,104,369, or in the J. Rabinow application Serial Number 115,267. My invention is particularly, although not exclusively, useful in map-matching machines.

Such machines make an optical examination of the characters, for instance, by a moving-spot scanner, a line scanner, or a full-examination scanner, and the scan procedure covers not only the unknown character but also its background. Ordinary photosensitive means are generally used for the character examination, and these means provide outputs corresponding to the unknown character (usually its projected image) and its background. Optical mask machines develop the outputs by using the masks themselves with the photosensitive means, whereas the electronic machines use other means, e.g., as disclosed in Patent No. 3,104,369. Electronic map-matching machines more clearly demonstrate the significance of my invention, and so the following description is in terms of this class of machine, although it is understood that my invention is not restricted thereto.

Most matching machines generally make a point-by-point, area-by-area, etc. examination of the entire character-field, regardless of the kind of examination device which is used. Electrical outputs from the examination device indicate whether the various areas making up the "field" (total area) are "black" (part of the character image) or "white" (part of the character background). More is said about "black" and "white" later. The above outputs are compared to a set of criteria peculiar to each character that the machine is expected to identify. The decision based on the comparison, may be made by the "best of match" technique (J. Rabinow Patent No. 2,933,246) or by other techniques. To aid in processing the character-data (the above-mentioned outputs), a system of "assertions," "negations" and "weighing" has been developed. These terms are defined in the referred-to applications essentially as follows:

An assertion is an output (optical, electrical, etc.) signifying that a character part, piece, feature, etc. appears in a given area of the field, i.e., where it is expected for a particular character.

A negation is an output signifying that no character part, piece, etc. appears in a given area of the field, and further, none should appear at that point.

The weighing technique is simply assigning a particular weight or value to given area by altering the effective output of an assertion or negation, in accordance with the probability of that area's contribution to a particular character.

For example of how a map-matching machine uses assertions, negations, and weighing, consider an O and a Q. These differ from each other by the Q-tail at the lower right corner of the Q. Thus, for a machine to recognize an unknown character "O," there must be "black" outputs at some points on the periphery of the "O" (called assertions), and there must be "white" outputs (negations) in the areas of the field where the Q-tail would appear. Since the Q-tail is so important in distinguishing the O from the Q, we would want to emphasize the negations (weighing), e.g., by increasing the value of the negation outputs. The J. Rabinow application Serial No. 140,966 discloses how all of this may be done optically, while the other applications disclose electrical means for doing this.

I have used the terms "black" and "white" in referring to areas of the character and its background respectively, and "black outputs" and "white outputs" to identify the signals emanating from these sub areas of the entire field. First of all, this description refers to a dark character on a light background, as in usual typing or other kinds of printing, but the invention applies equally to a light character on a dark background as in photographic negatives, microfilms, etc. Secondly, we do not ordinarily experience perfect "black" (100% light absorption) and perfect "white" (100% light reflectance), but these terms are used as a matter of convenience. In actual practice, the various gradations of gray instead of true black and white are a source of difficulty which my invention overcomes, as explained below.

In a machine where the criterion for each character corresponds to an area-for-area image (or skelital image where only significant areas are used) of the character which it represents, a variation in the optical density of the unknown character may affect the assertions differently from the negations. There are many causes of variations of optical density, for example; some print is darker than others; some characters of print have light and dark pieces; and line width of characters can vary, as explained below. If the sub area of examination is $\frac{1}{32}$ inch wide, and a black piece of a character of the same width is examined, the examination device, e.g., a photocell, will produce an output indicating that the examined piece is black. But if the same photocell examines a piece of a black character and the piece is only $\frac{1}{64}$ inch wide, the photocell will provide an output as though the character piece were gray. Accordingly, line widths of characters affect character recognition in the same way as variations in optical density of the characters.

The following example will show how variations in optical density of the characters or changes in optical density of the character background which is the same problem, and variations in character-line width, affect map-matching reading machines whose recognition uses assertion and negation techniques. In one character-field, assume that there are twenty assertion areas and five negation areas, each providing its output of one "unit" when a perfect black and white field is examined. If the optical density is changed so that the black is only 50% black (gray) and the white background remains white, the assertions will now provide only ten units of output and the negations will still provide five units. This alone probably will present no problem, but this is not the near the worse case. A more difficult case is where the assertion and negation outputs are such that we have actual reversals, i.e., the character is recognized by the negation outputs becoming so strong as to overcome the assertions and have the machine falsely identify an unknown character. This will be described later in connection with the examples and curves shown in the drawings. My invention overcomes this difficulty, by requiring that the assertion areas be in the same proportion as the negation areas (including weights) for all characters. It must be remembered that to identify an unknown character, its image must be compared to all of the character-criteria. Thus, it is not possible to consider each character individually as in the above example. They must be studied in relation to all criteria, i.e., what will be the result when an unknown is compared to each criterion. In making this kind of comparison I have found that giving equal weights for assertions and negations is a special case of a more general solution to prevent reversals, and attenuate the effects of reflectance changes. The general rule is that the total assertion and negation weights for each character-criterion of the reading machine must be in the same or substantially the same ratio.

My invention is particularly useful in analog machines, where the examination device outputs correspond to the optical density of each area of the field. For instance, see application Serial Number 115,267 where the machine continually deals with a range of analog outputs. Even digital machines, e.g. as disclosed in Patent No. 3,104,369 have difficulty with variations in light reflectance which can be partially overcome by quantizing. My invention, applied to digital machines, will provide the same benefits to their recognition circuits as in an analog machine. Quantizing, even at several levels as in the J. Rabinow and A. Holt Patent No. 3,104,372, is only a partial solution to the over-all problem of recognizing characters whose optical density varies.

Accordingly, an object of my invention is to provide a system for causing the variations in the assertions and negations of each character-criterion of a reading machine to be uniform throughout the group of criteria.

Another object of the invention is to provide a system for overcoming the problems of reversals due to variations in reflectance of character-fields regardless of the cause of the variations.

Anotoher object of my invention is to provide a system for overcoming non-linear response (of the recognition section of a reading machine) to variations in light reflectance of characters and/or their background.

Other objects and features will become evident in following the description of the illustrated form of the invention which is given by way of example only.

Figures 2, 2A, 2B, 5:
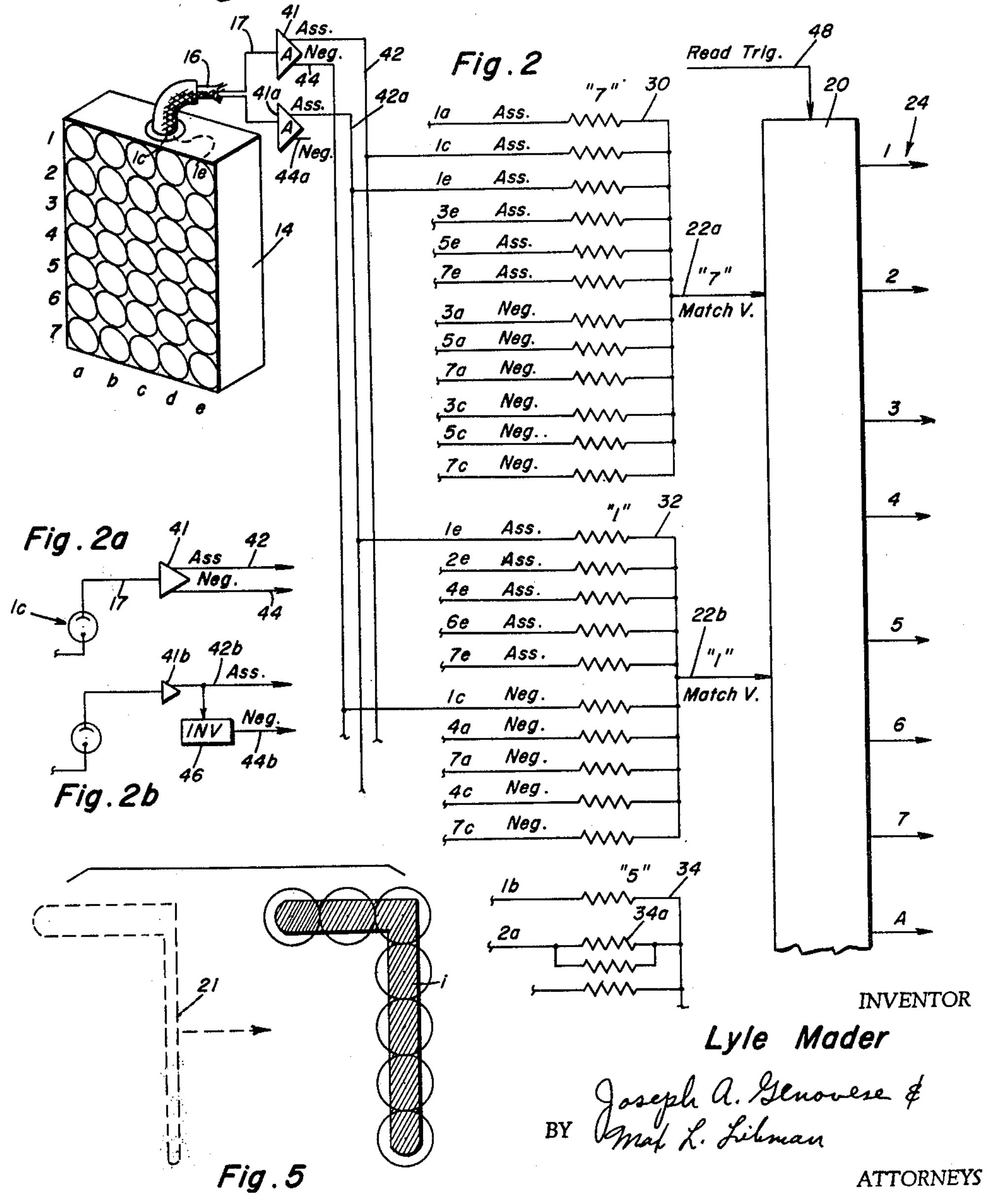
FIGURE 2 is a diagrammatic view showing typical matrices for the characters 1 and 7 and their connections with the mosaic examination device, the matrices forming a part of the recognition circuits of a map-matching reading machine.

FIGURES 2*a* and 2*b* are schematic views showing two methods of deriving assertions and negations and also showing a convention followed herein, where the assertion wire is always the upper of the assertion-negation pair.

Figures 3, 3A, 3B, 4, 4A, 4B:
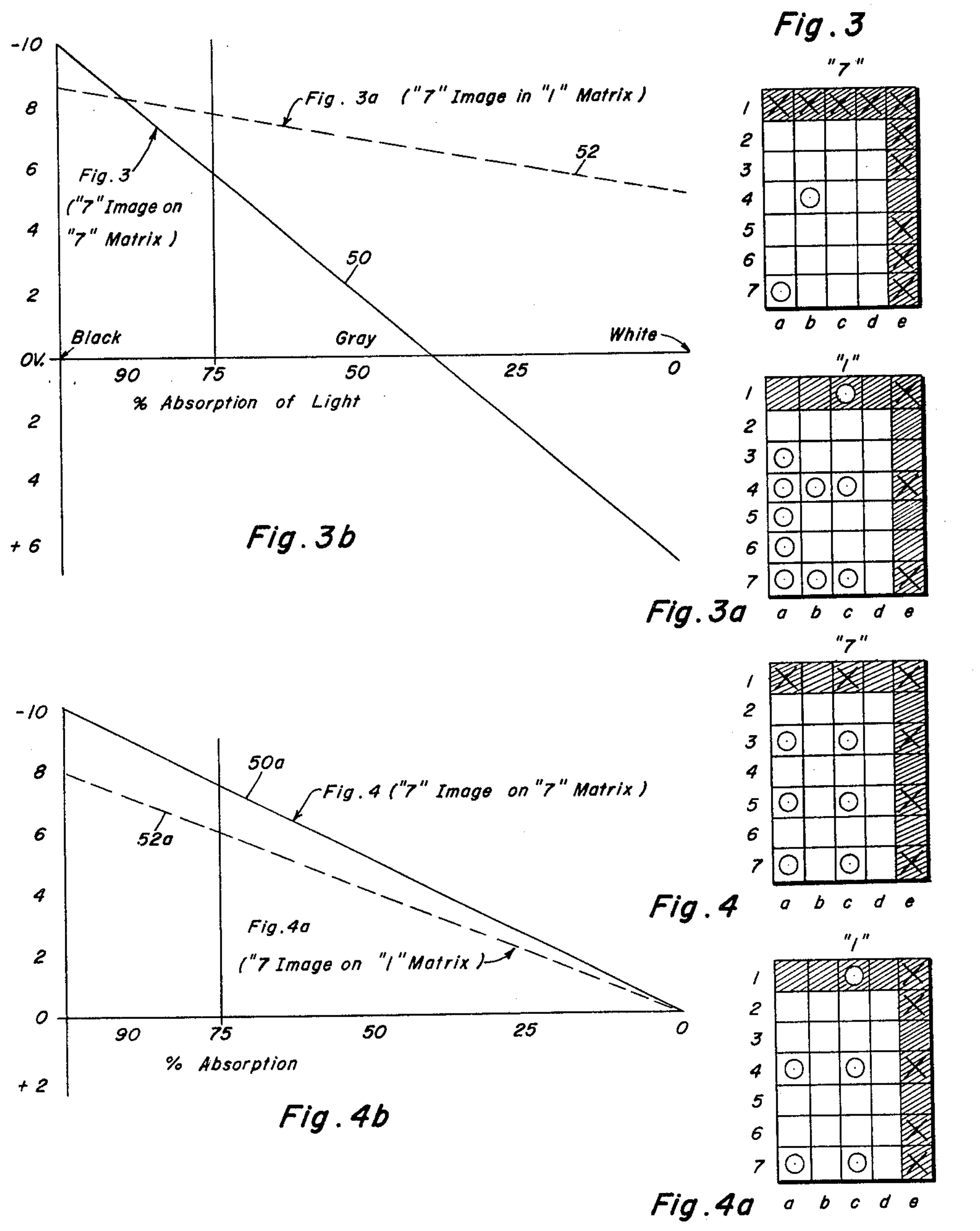

FIGURE 3 is a diagrammatic view showin an image of a 7 "on" a match voltage matrix for a 7, where the examination assertion sub-areas (points) marked by X's are arbitrarily selected, as are the negation points, marked by O's.

FIGURE 3*a* shows the 7 image "on" the 1 matrix where the assertion points for the 1 are arbitrarily selected, as are the negation points.

FIGURE 3*b* is a graph of curves for the output signals of the matrices in FIGURES 3 and 3*a* for a zero to 100% light absorption character (perfect black to absolute white) on a white background.

FIGURE 4 is a diagram similar to FIGURE 3 but with the ratio of assertions to negations selected in accordance with the invention.

FIGURE 4*a* is a view similar to FIGURE 3*a* but with my selected ratio, according to the invention.

FIGURE 4*b* is a diagram showing curves which are considerably more favorable to accurate character recognition than those of FIGURE 3*b*.

FIGURE 5 is a diagrammatic view showing that differences in character-line width are as much a source of light reflectance differences as changes along the gray scale in the print itself.

*Background*

Figure 1:
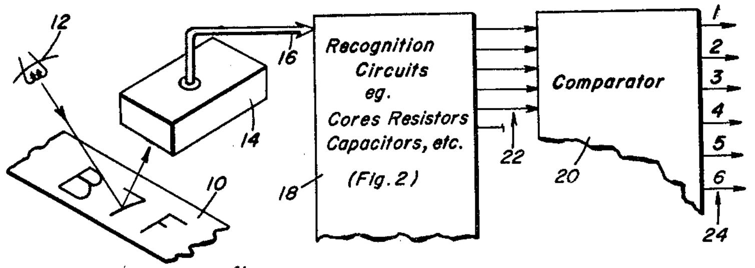
FIGURE 1 is a block diagram of the sections of a reading machine which are involved in my invention.

In the accompanying drawings FIGURE 1 shows a block diagram of a reading machine for a document 10 illuminated by light source 12. Images of the characters on the document are projected by an optical system (not shown) onto the face of an examination device 14. Accordingly, as document 10 moves, the images of successive characters are projected onto the examination device 14.

Examination device 14 is only diagrammatically shown, it being understood that it represents any type of scanner, for instance a full field scanner, a line scanner, a moving spot scanner, etc. The information developed at the scanner is conducted on the wires of cable 16 and applied to recognition circuits 18 which may be made of magnetic cores, resistor matrices, capacitors, etc. In general, if the machine is constructed along the lines of the machines disclosed in Patent No. 3,104,369 the recognition circuits would include resistor matrices (FIGURE 2), although my present invention is not limited to a given type of reading machine. In fact, the recognition circuits may be more like those disclosed in the J. Rabinow copending application Serial No. 140,966 or 115,267. In the last mentioned application, the scanner is a full-field examination device whereas, in the first two references, different types of scanners are shown. Regardless of the configuration of the recognition circuits, their purpose is to summarize the scan data and provide an output suitable for processing by a comparator 20 to enable the comparator to make a decision as to the identity of the scanner character. In the type of reading machine which is given as background material for my present invention, the recognition circuits provide individual outputs on lines 22, called match voltage lines herein, with the signal voltage for the unknown character being "better" than any other. Thus, the duty of the comparator is to select the "best" voltage on lines 22 for each character, and provide an output on one of the output lines 24 of the comparator, which identifies the unknown character.

FIGURES 2–2*b* show portions of the reading machine system of FIGURE 1, in more detail. Examination device 14 is shown by way of example, as of a mosaic of photocells in rows 1–7 and columns *a–e* inclusive. This identification is used on the resistor matrix input lines of matrices 30, 32 and 34. The resistor matrices are for the characters 7, 1 and 5 respectively, it being understood that there will be an addtional matrix for each other character which the machine is capable of identifying. The details of the matrices 30 and 32 are discussed later. At present it is sufficient to know that they are adders whose inputs are from selected points (photocells) of examination device 14. Further, the selected points may be assertions or negations, depending on the shape of the character which the matrix represents. Assertions and negations from each photocell output are obtained as shown below. FIGURE 2*a* shows a single photocell 1*c* of examination device 14 and an output line 17 connected to the photocell and to an inventing amplifier 41 having two output lines 42 and 44 respectively. The upper line 42 is the assertion line and the lower wire 44 is the negation line. The construction of the amplifier is such that the outputs swing about a reference, for example 0 volts, and the output signals on lines 42 and 44 are the inverse of each other. The same result could be obtained (FIGURE 2*b*) by using a single output amplifier 41*b* whose output line 42*b* conducts the assertion signal.

The negation signal is on line 44b connected to line 42b through an inverter 46. Assume that when the photocell sees no light, the assertion signal on line 42 is minus 10 volts. Then, the signal on line 44 will be plus 10 volts. Conversely, if the photocell sees "white" the signal on line 42 will be plus 10 volts and the signal on line 44 will be minus 10 volts. When the photocell sees various shades of gray, the assertion output will have a signal strength corresponding thereto, and the negation signals will be proportional but inverted. Considerably more is said about this under the next sub-title herein. Although I have shown only two amplifiers (FIGURE 2) 41 and 41a connected with photocells 1c and 1e respectively, there will be a similar amplifier for each photocell. The assertion and negation lines from each amplifier form buses (42, 44 and 42a, 44a, etc.) for connection with all resistor matrices (or the equivalent) of the reading machine. The procedure for selection of specific connection of the matrix input wires with the buses is described in the next paragraph.

Matrices 30 and 32 are voltage adders constructed as follows: The "7" matrix is made of a plurality of resistors connected in parallel and having a match voltage output line 22a which forms one input to the comparator 20. To construct matrix 30, the outputs of the photocells of examination device 14 are selected in accordance with the expected configuration of the character, "7," in this instance. The selected assertion and negation points are shown pictorially in FIGURE 4 by X's and O's respectively. Thus, for the "7," points 1a, 1c, 1e, 3e, 5e and 7e of examination device 14 are chosen, and necessary connection with the assertion buses are made. FIGURE 2 shows only two complete connections which are matrix wire 1c-to-bus 42, and matrix wire 1e-to-bus 42a. The assertion-negation philosophy is that if the image of a character covers these assertion points the first step of the recognition of the character will be satisfied. In order to distinguish the unknown character from others, we select certain photocells of the scanner and postulate that these must see no portion of a character image. Thus, the negation buses corresponding to points 3a, 5q, 7a, 3c, 5c and 7c.

Matrix 32 is designed specifically for the character "1," Assertion and negation points peculiar to the image of the character "1" are selected in a manner similar to the above, except, of course, the points are different as indicated by the legends in FIGURE 2, and shown pictorially in FIGURE 4a. Since the matrices are voltage adders, weighing is obtained by simply changing the values of the resistors. I have shown a double resistor 34a in the "5" matrix 34 to diagrammatically show a lower value resistor which would mean that the point 2a is emphasized in comparison to other points.

In deciding on the identity of an unknown character, the match voltage signals, for instance on lines 22a and 22b, for all characters are compared by comparator 20. The comparator selects the "best" voltage. The word "best" as used herein will mean the most negative voltage. Since the comparator compares the match voltage signals of all matrices when each unknown character on document 10 is examined, the comparator may be gated on by a "read" trigger signal on line 48. The construction of the comparator and the development of the "read" signal on line 48 are unimportant to my present invention, and may be in accordance with Patent No. 3,104,369 and/or co-pending application Serial No. 115,267.

*Statement of problem and invention*

Attention is now directed to FIGURES 3–3b inclusive. FIGURES 3 and 3a are diagrammatic views showing the correspondence between selected points of the examination device 14 and the assertion and negation points of two resistor matrices. One resistor matrix (FIGURE 3) is designed to provide a match voltage to recognize the character "7" and the other (FIGURE 3a) is designed to recognize the character "1." The image of the unknown character "7" is superimposed on both of these figures. For the purpose of explanation, it may be assumed that the selection of assertion and negation points in FIGURES 3 and 3a is made reasonably but in a manner which is not in accordance with my invention. Upon first examination it would seem that the selection of assertions in FIGURE 3 would surely identify the character "7" from other characters and that the signal on the match voltage line would always be very good. This is a correct assumption, but unfortunately, each matrix cannot be considered by itself; it must be considered in relation to all other matrices. Thus, let us consider FIGURE 3a which is a "heavily negated" matrix to recognize the character "1." The assertion points are 1e, 4e and 7e. But since the character "1" is simply a vertical line, it has to be distinguished from other characters having vertical lines by using a number of negations. Thus, negation points (3a, 4a, 5a, 6a, 7a, 4b, 7b, 1c, 4c and 7c) are selected to distinguish the "1" from characters as 7, 4, T, B, H, etc. When the character "1" is the unkown character projected on the examination device there will be an excellent match voltage conducted on the match voltage line from "1" matrix (FIGURE 3a) to the comparator. When the character "7" is the unknown character, the negation point 1c (meaning no part of the image must appear on this point) of the "1" matrix (FIGURE 3a) will not be satisfied, and the match voltage signal from the "1" (FIGURE 3a) matrix will not be as "good" (negative) as the match voltage signal from the "7" matrix (FIGURE 3). Thus, the unknown character would be identified as a "7" due to the signal of the "7" matrix (FIGURE 3) which would be correct.

The above examples are given with the understanding that the image of the character is perfect black (one hundred percent absorption of the light) and the background of the character is perfect "white" (no absorption of light). In actual practice these ideal conditions never exist. Characters are actually shades of gray although they appear black to the eye. Even printing which is very uniform and seemingly very black, is not actually black, i.e., capable of absorbing one hundred percent of the light from source 12 (FIGURE 1). Furthermore, even if an image of the character were perfectly black, as shown in FIGURE 5, the width of the lines making up the character will not ordinarily cover an entire photocell of the scanner. Image *i* (FIGURE 5) covers approximately 50 or 60 percent of the various photocells, so that the outputs from the photocells will be something less than maximum signal, just as though the perfectly black image were gray. Image 2*i* in FIGURE 5 provides an even worse condition, where one part of the character is made of a line which is much thinner than the other line. When the image 2*i* is projected onto the group of photocells shown in FIGURE 5, some of them will provide outputs as though the image were very light gray and others will provide outputs as though the image were darker gray. The effect of this and other changes in reflectance is shown graphically in FIGURE 3b.

Curves 50 and 52 represents the match voltage signals from the matrix arrangements of FIGURES 3 and 3a respectively for the entire range of light absorption of the character "7." For the ideal condition (FIGURE 3b) where the character is absolutely black and the background absolutely white, the "7" matrix will provide a better match voltage signal (−10 volts) than the "1" matrix (−8$\frac{6}{13}$ volts) when a "7" image is being investigated. But, as the percentage of light absorption changes (image gets lighter) the signal represented by curve 50 falls at a much greater rate than the signal represented by curve 52. When the image of the character "7" absorbs about 90% of the light, there is a complete ambiguity because the match voltages from the "7" matrix and the "1" matrix are equal. What is even worse, when the image is 75% light absorbing (a very practical and usual percentage) the signal represented by curve 52 is more negative than the signal represented by curve 50 because the assertions lose signal strength as the grayness approaches white, and the negations retain the same signal strength. Therefore, the reading machine would recognize the "7" erroneously as the character "1." My invention prevents this from happening. A cursory examination of FIGURE 4*b* will show that the curves 50*a* and 52*a* are considerably more favorable to accurate recognition than the curves 50 and 52. I will show later, by specific examples, how all of the curves are obtained.

I have found that by maintaining the number of assertions and the number of negations in the same ratio for all resistor matrices, the conditions shown in FIGURE 3*b* can never exist. By using the same ratio I mean that if the matrix 30 in FIGURE 2 has six assertions and six negations, the other matrices for the other characters, for instance, matrices 32 and 34 and the others which are not shown, should have assertions and negations resistors in the same ratio. This means that for the example under consideration, there should be 50% assertions and 50% negations for the numeral "1," other numerals and all letters and symbols. Even if the precise ratio is not maintained it should be substantially the same throughout the recognition section of the machine. Furthermore, similarity of ratio does not mean a one-to-one ratio as shown in FIGURES 4, 4*a*, and 2. It could be any other ratio as long as it is maintained uniform throughout the machine. By doing this, changes in light absorption (characters grow darker or lighter) linearly effects the assertions and negations throughout recognition section of the machine.

The following computations show how the curves of FIGURES 3*b* and 4*b* are obtained, with these assumptions; the voltage swing is from minus 10 to plus 10; the best signal is the most negative signal; the amplifiers 41, 41*a*, etc., are linear. Accordingly, when a photocell "sees" no light (100% black) the assertion output is minus 10 volts and the negation output is plus 10 volts. When the photocell "sees" dark gray (75% light absorption) the outputs of its amplifier are −5 volts and +5 volts respectively for the assertions and negations. When a photocell sees medium gray (50% light absorption) the output of the amplifier associated therewith is 0 volts for both assertion and negation. When the photocell sees perfect white, the assertion output is plus 10 volts and the negation output is minus 10 volts. Since the resistors of the matrices are connected in parallel, the following statement is true:

$$\text{Match Voltage}=\text{MV}=\frac{(\epsilon-\text{v's})+(\epsilon+\text{v's})}{\text{Number of v paths}}$$

MV when 100% Black "7" is examined

| "7" MATRIX (Fig. 3) | "1" MATRIX (Fig. 3*a*) |
|---|---|
| $\text{MV}=\frac{12(-10\text{ v.})}{12}=$ | $\text{MV}=\frac{12(-10)+1(+10\text{ v.})}{13}=$ |
| $\text{MV}=\boxed{-10\text{ v.}}$ CORRECT RECOGNITION | $\text{MV}=-8\tfrac{9}{13}\text{ v.}$ |

MV when 75% Black "7" is examined

| "7" MATRIX (Fig. 3) | "1" MATRIX (Fig. 3*a*) |
|---|---|
| $\text{MV}=\frac{10(-5\text{ v.})+2(-10\text{ v.})}{12}=$ | $\text{MV}=\frac{9(-10\text{ v.})+3(-5\text{ v.})+1(+5\text{ v.})}{13}=$ |
| $\text{MV}=-5\tfrac{5}{6}\text{ v.}$ | $\text{MV}=\boxed{-7\tfrac{9}{13}\text{ v.}}$ INCORRECT RECOGNITION |

MV when 75% Black "7" is examined

| "7" MATRIX (Fig. 4) | "1" MATRIX (Fig. 4*a*) |
|---|---|
| $\text{MV}=\frac{12(-10\text{ v.})}{12}=$ | $\text{MV}=\frac{9(-10\text{ v.})+1(+10\text{ v.})}{10}=$ |
| $\text{MV}=\boxed{-10\text{ v.}}$ CORRECT RECOGNITION | $\text{MV}=-8\text{ v.}$ |

MV when 100% Black "7" is examined

| "7" MATRIX (Fig. 4) | "1" MATRIX (Fig. 4*a*) |
|---|---|
| $\text{MV}=\frac{6(-5\text{ v.})+6(-10\text{ v.})}{12}=$ | $\text{MV}=\frac{4(-10\text{ v.})+5(-5\text{ v.})+1(+5\text{ v.})}{10}=$ |
| $\text{MV}=\boxed{-7\tfrac{1}{2}\text{v.}}$ CORRECT RECOGNITION | $\text{MV}=-6\text{ v.}$ |

It is pointed out in the above examples there are six assertion points (FIGURE 4) and six negation points, and five assertion points (FIGURE 4*a*) and five negation points, respectively. The number of points in each figure is different, but their ratio (one-to-one) is the same. As far as weighting is concerned, if (for convenience) the resistor values are halved, a weighted position will count as two points i.e., either assertions or negations. In other words, each additional "weight" must be counted as an additional assertion or negation depending on whether it is an assertion or negation that is weighted.

Returning now to FIGURE 4*b*, it will be seen that the curves 50*a* and 52*a* approach each other at zero light absorption. This would mean that as the print finally reaches 100% reflection (totally white) the signals represented by curves 50*a* and 52*a* could not be distinguished. However, this is reasonable because if the characters have 100% or near 100% absorption, they will not be printed at all or will be so light that they would not even be readable by a human being.

It is understood that various changes, alterations and modifications may be resorted to without departing from the protection of the following claims. For example, the preceding description deals with a reading machine recognition section having resistor matrices to develop match voltages. Some of the previously referred to pending applications and patents have capacitors in addition to or in place of resistors, and the principles of my invention apply equally well to magnetic core reading machines, and electrical or electronic neuron cells. Also, my system makes it easier to set a minimum acceptance level for character recognition (e.g. −5 volts in FIG. 4*b*) because the characteristic curves for all of the characters are similar through a wide range of reflectance changes.

I claim:

1. In a system to identify characters by machine where the characters have a contrasting background, means to examine the individual areas of a character and its background and to provide outputs corresponding to the optical density of each area, criteria means for the characters that the machine is capable of identifying, each criterion means including components which correspond to some first areas which an examined character is expected to occupy and other second areas which the examined character background is expected to occupy, said first and second components being in a predetermined ratio to each other for said criterion means, and the criteria means for all others of the characters having components for their characters and background areas in substantially the same ratio, and means to effect a comparison of said outputs with said criteria means.

2. In a system to identify characters by machine where the characters have a contrasting background, means to examine the individual areas of a character and its background and to provide outputs corresponding to the optical density of each area, means defining criteria for the characters that the machine is capable of identifying, each criterion including components which correspond to some first areas which an examined character is expected to occupy and other second areas which the examined character background is expected to occupy, said first and second components being in a predetermined ratio to each other for said criterion, and the criteria for all others of the characters having first and second components for their character and background areas in substantially the same ratio so that all of the criteria are similarly affected when the optical density of the characters and their backgrounds change, and means operatively connecting said examining means with said criteria to compare said outputs with said criteria.

3. In a reading machine for recognizing characters on a contrasting background where an unknown character is identified by a comparison to criteria representing all characters that the machine is capable of identifying; means to examine the elemental areas constituting the unknown character and its background and for providing outputs which correspond to the reflectance of said areas; means establishing said criteria including means for each character to combine first outputs from at least some of said elemental areas that the character is expected to occupy with second outputs from at least some of elemental areas that the character is expected not to occupy, said outputs for each criterion being in substantially the same ratio of first and second outputs, said combining means providing match outputs corresponding to the degree of match of said unknown character with each of said criterion; and a comparator for said match outputs.

4. The reading machine of claim 3 and means to emphasize some of said elemental areas by causing the said outputs associated with the examination thereof to be disproportionate to the reflectance of the emphasized areas.

5. The reading machine of claim 4 wherein said number of areas where a character is expected plus said emphasis means and said number of areas where the character is not expected plus their emphasis means are in the same proportion for each criterion so that changes in reflectance of unknown characters will effect all of the match outputs in substantially the same proportion.

6. In a reading machine having an examination device for a character and its background where the examination device provides outputs which correspond to the optical density of said character and background, a character recognition criterion means for each character that the machine is capable of identifying, means responsive to said outputs to provide assertion and negation signals, conductive means for said signals, predetermined conductive means corresponding to selected sub areas of the characters and their backgrounds connected to said criterion means for all of said characters so that said outputs are compared to all of said criterion means when a single unknown character is examined, and the conductive means for assertion signals and negation signals being in substantially the same proportion for each criterion means so that changes in light absorption of the unknown characters effect each criterion means in substantially the same proportion.

7. The reading machine of claim 6 wherein said criterion means each comprise a matrix of elements.

8. The reading machine of claim 7 wherein some of said elements are weighted, and the weighing factor is added in obtaining said substantial proportionality.

References Cited by the Examiner

UNITED STATES PATENTS

| | | | |
|---|---|---|---|
| 2,932,006 | 4/60 | Glauberman | 340—146.3 |
| 2,978,674 | 4/61 | Highleyman | 340—146.3 |

FOREIGN PATENTS

| | | |
|---|---|---|
| 781,931 | 8/57 | Great Britain. |

MALCOLM A. MORRISON, *Primary Examiner.*